US004001688B2

United States Statutory Invention Registration [19]

[11] Reg. Number: H1688

Lake et al.

[45] Published: Nov. 4, 1997

[54] FORCE DEFLECTION ANEMOMETER HAVING IMPROVED ACCURACY

[75] Inventors: Robert E. Lake, Lusby; Curtis L. Meyerhoff, Leonardtown, both of Md.

[73] Assignee: The United States of America as represented by the Secretary of the Navy, Washington, D.C.

[21] Appl. No.: 356,435

[22] Filed: Dec. 15, 1994

Related U.S. Application Data

[63] Continuation-in-part of Ser. No. 231,097, Apr. 22, 1994, abandoned.

[51] Int. Cl.[6] ..... G01P 5/02

[52] U.S. Cl. ..... 73/170.15

[56] References Cited

U.S. PATENT DOCUMENTS

| | | | |
|---|---|---|---|
| 2,959,052 | 11/1960 | Alexander et al. | 73/170.15 |
| 3,212,329 | 10/1965 | Bisberg | 73/170.15 |
| 3,217,536 | 11/1965 | Motsinger et al. | 73/170.15 |
| 3,340,732 | 9/1967 | Scoggins | 73/170.15 |
| 3,552,204 | 1/1971 | Tourmen | 73/170.15 |
| 3,572,116 | 3/1971 | Penn | 73/170.15 |
| 3,878,714 | 4/1975 | Protta et al. | 73/170.15 |
| 4,730,485 | 3/1988 | Franklin et al. | 73/170.15 |
| 4,788,869 | 12/1988 | Li | 73/170.15 |
| 5,117,687 | 6/1992 | Gerardi | 73/170.15 |

FOREIGN PATENT DOCUMENTS

| | | | |
|---|---|---|---|
| 56-6111 | 1/1981 | Japan | 73/170.15 |

*Primary Examiner*—Bernarr E. Gregory
*Attorney, Agent, or Firm*—Susan E. Verona; Ron Billi

[57] ABSTRACT

An anemometer having no moving parts and a sensing head with various embodiments that improve the overall performance of the anemometer is disclosed. The sensing head of the anemometer generates an aerodynamic drag force when subjected to a dynamic pressure in the form of a moving fluid, such as wind. The aerodynamic drag force is translated to a deflectable column having a plurality of strain gauges thereon, each of which produces an electrical output voltage that is proportional to the wind speed. The sensing heads of the anemometer of the present invention reduced the velocity and directional error measurement parameters as well as reduce the angle of attack error.

6 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

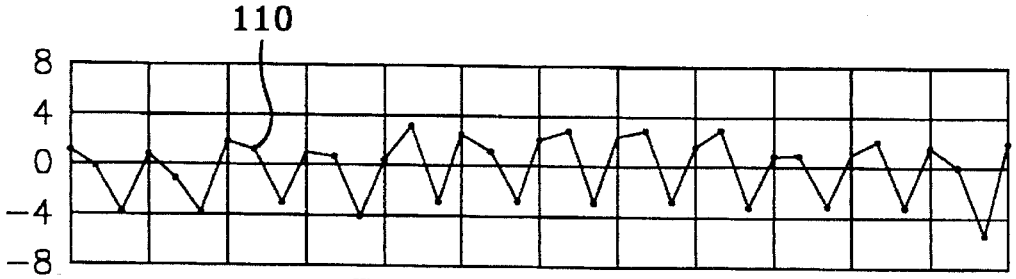
FIG−12A
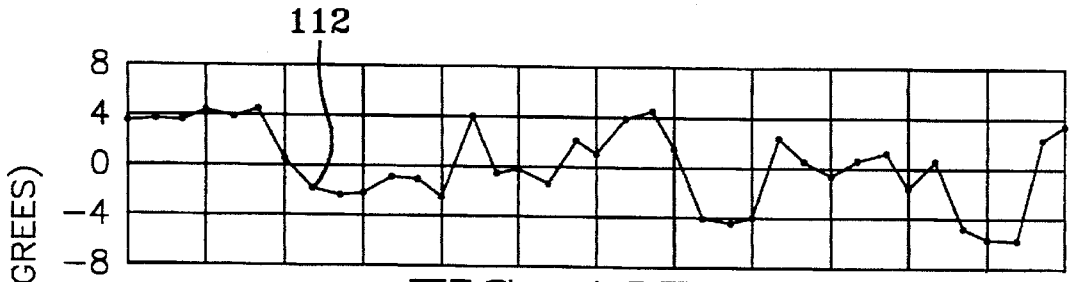
FIG−12B
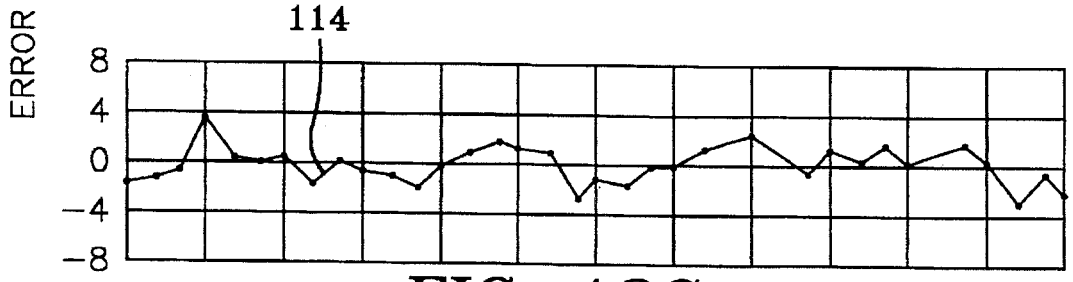
FIG−12C
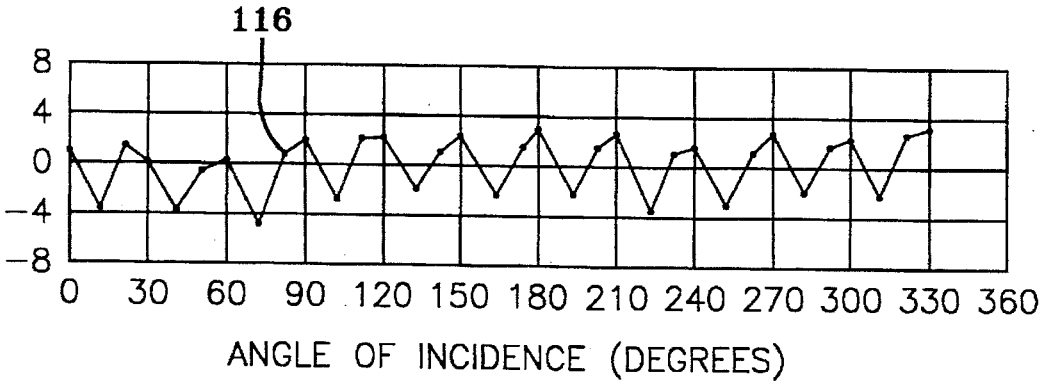
FIG−12D

FORCE DEFLECTION ANEMOMETER HAVING IMPROVED ACCURACY

CROSS REFERENCE TO RELATED APPLICATION

This application is a continuation-in-part of application Ser. No. 08/231,097, filed on Apr. 22, 1994, assigned to the same assignee as the present invention, and herein incorporated by reference, now abandoned.

STATEMENT OF GOVERNMENT INTEREST

The invention described herein may be manufactured and used by and for the Government of the United States of America for Governmental purposes without the payment of any royalty thereon or therefor.

FIELD OF THE INVENTION

This invention relates to anemometers, and more particularly, to an anemometer having no moving parts and which can measure high velocity winds. Specifically, the invention relates to an anemometer having parameters that reduce measurement errors.

BACKGROUND OF THE INVENTION

Anemometers are primarily used to measure air flow and commonly comprise a rotating element whose angular speed of rotation is correlated with the linear velocity of the air flow. The common anemometer is generally limited to measuring wind velocities which are mostly steady state conditions because the rotating element interferes with the ability of the anemometer to accurately measure pulsating or dynamic wind conditions. Pulsating wind conditions, having speeds up to about 100 knots, may be measured by an ion beam deflection anemometer.

The cross-referenced U.S. application Ser. No. 08/231,097 describes a force deflection anemometer that does not suffer any of the previously mentioned prior art drawbacks. Although the anemometer described in Ser. No. 08/231,097 serves well its intended purpose, it is desired that further improvements be provided, especially those reducing the errors of the anemometer involved with measuring the velocity and the direction of the flowing fluid, such as high velocity winds, generated by hurricanes, aircraft propellers, helicopter rotors, jet engines and the like.

SUMMARY OF THE INVENTION

The present invention is directed to an anemometer that has the capability of measuring the velocity and direction of flowing fluids, such as wind, having speeds in excess of 100 knots and does so with an accuracy that is improved relative to prior anemometers.

The anemometer measures the velocity and direction of a fluid flowing over a surface of interest and comprises a base, an elongated member, and a plurality of sensors. The base has means for connecting to the surface of interest and the elongated member is connected to and extends from the base. The elongated member comprises a material having resiliency and has first and second portions at opposite ends thereof, with the first portion being cylindrical and having means for creating an aerodynamic drag force when placed in the flowing fluid which, in turn, causes the second portion of the elongated member to be subjected to strain and correspondingly deflect. A plurality of sensors are mounted, in a predetermined manner, on the second portion to measure the amount of the deflection induced strain and the direction of this deflection induced strain when the first portion is placed in the flowing fluid. The means for controlling the vortex formation about the first portion comprises surface irregularities arranged in a predetermined manner for inducing a turbulent boundary layer in the fluid flowing over the first portion.

Accordingly, it is an object of the present invention to provide an anemometer for measuring the speed and direction of a fluid flowing over a surface of interest and that creates a turbulent boundary layer in the flowing fluid which, in turn, creates an aerodynamic drag force that allows the sensors of the anemometer to measure the amount of the deflection induced strain and the direction of the deflection induced strain both caused by fluid flowing over the anemometer.

It is a further object of the present invention to provide an anemometer having improved accuracy for measuring the velocity and the direction of flowing fluid.

It is another object of the present invention to provide an anemometer having a reduced angle of attack and angle of incidence error so that the anemometer may more readily and accurately intercept flowing fluid.

Other objects, advantages and novel features of the invention will become apparent from the following detailed description when considered in conjunction with the accompanying drawings therein.

BRIEF DESCRIPTION OF THE DRAWINGS

FIG. 12 is composed of FIGS. 12A, 12B, 12C, and 12D that respectively illustrate the angular resolution errors at 100 knots associated with four sensing heads related to the present invention.

DETAILED DESCRIPTION OF THE PREFERRED EMBODIMENTS

Figure 1:
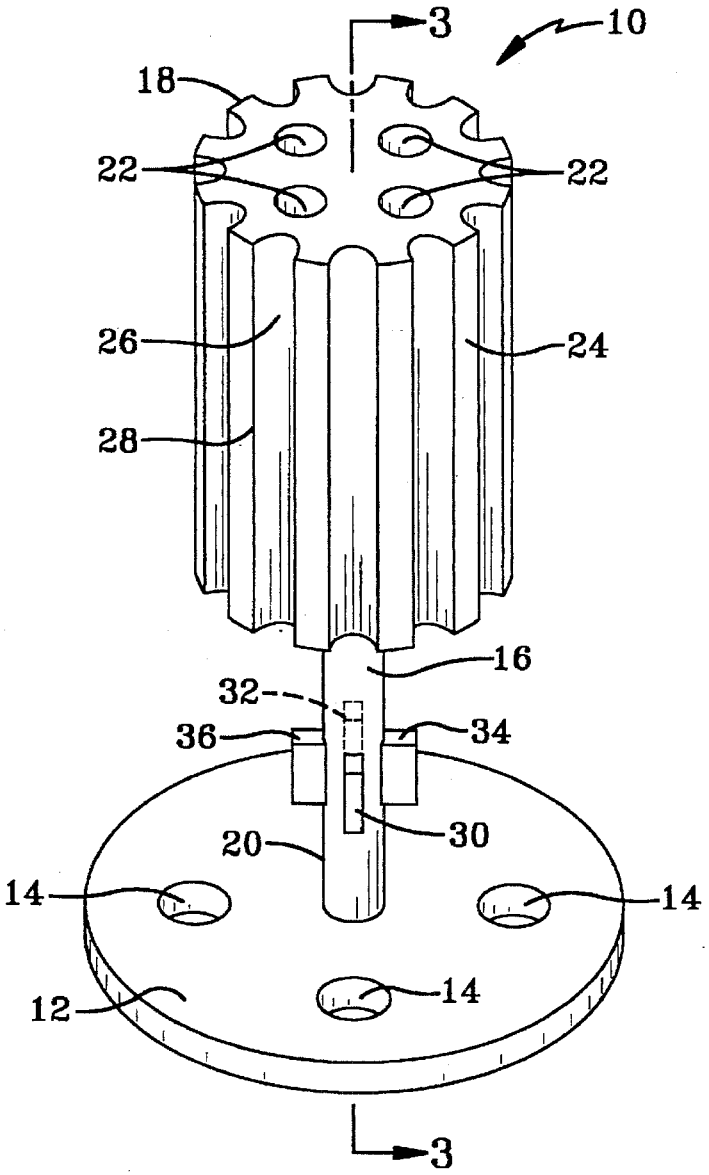
FIG. 1 is a perspective view incorporating some of the principles of the present invention.

Referring now to the drawings, wherein like reference numbers indicate like elements, there is shown in FIG. 1 an anemometer 10 incorporating some of the features of the present invention. The anemometer 10 is fully described in the previously incorporated by reference U.S. patent application Ser. No. 08/231,097 but is also described herein so as to provide an understanding that allows for a better appreciation of the primary features of the present invention to be more fully described hereinafter with reference to FIGS. 5, 6 and 9–15.

In general, anemometer 10 measures the speed or velocity and direction of the fluid flowing over a surface of interest and comprises a base 12 preferably of an aluminum material, having means, such as openings 14, for being connected to the surface of interest, and an elongated member 16, also preferably of an aluminum material having a resilient characteristic, connected to and extending from the base 12.

The elongated number 16 has first and second portions 18 and 20, respectively, at opposite ends thereof with the first portion 18 being cylindrical, preferably formed of a nylon material, and serving as a sensing head. The second portion 20 is preferably cylindrical and formed of aluminum and has a diameter which is less than the diameter of the first portion 18. The sensing head 18 preferably has openings 22 which reduce its mass in a manner as to be further described hereinafter, and means for creating an aerodynamic drag force when placed into a flowing fluid which, in turn, causes the second portion 20 of the elongated member 16 to be subjected to strain and correspondingly to deflect. The sensing head 18 has an outer surface 24, and flute like longitudinal cutouts 26 having edges 28 which serve as the means for controlling the aerodynamic drag force in a manner as more fully described in U.S. patent application Ser. No. 08/231,097. The second portion 20 of the elongated member 16 has a plurality of sensors 30, 32 (not shown in FIG. 1), 34 and 36 mounted thereon and which may be further described with reference to FIG. 2.

Figure 2:
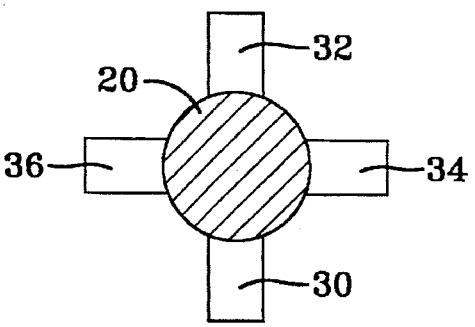
FIG. 2 is a schematic illustrating the orientation of the sensors of the anemometer of the present invention.

As seen in FIG. 2, the four sensors 30, 32, 34 and 36 are spaced apart from each other by about 90° around the circumference of the second portion 20 and are configured into two pairs, with each pair comprising two sensors, such as 30 and 32, arranged to be diametrically opposite each other. In operation, and as to be more fully described, one pair of the sensors of the anemometer 10, such as 30 and 32, is arranged along one axis of flowing fluid, such as the X axis, whereas the other pair, such as 34 and 36, is arranged along another axis of flowing fluid, such as the Y axis. The details of the second portion 20, as well as further details of the anemometer 10, may be further described with reference to FIG. 3, which is a view taken along line 3–3 of FIG. 1.

Figure 3:
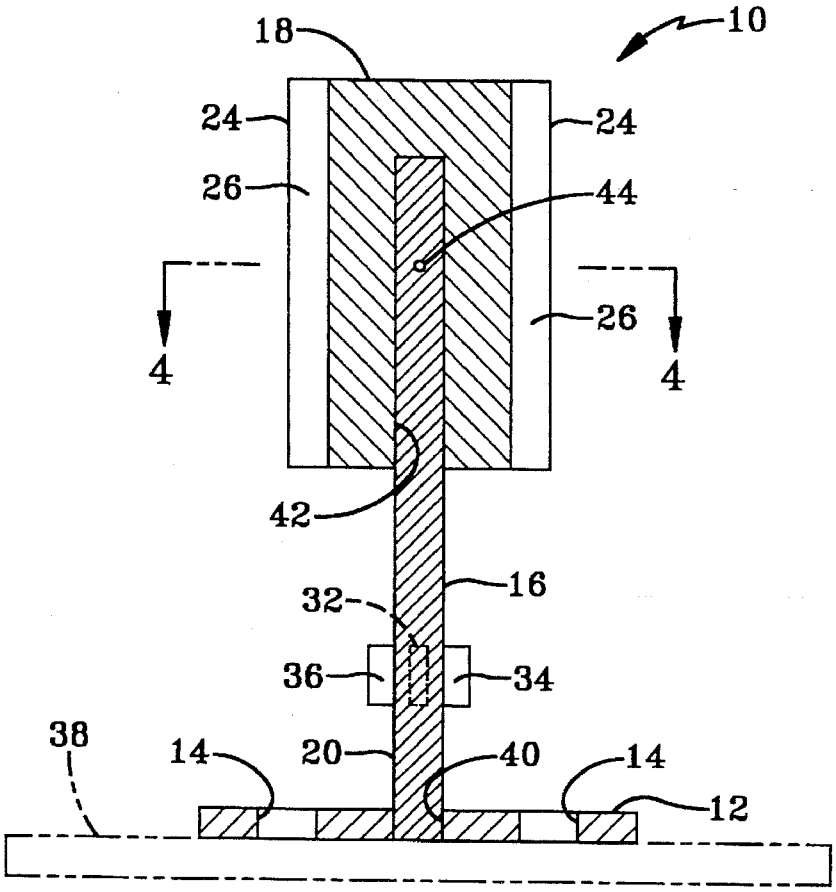
FIG. 3 is a view, taken along line 3—3 of FIG. 1, illustrating further details of the anemometer of FIG. 1.

FIG. 3 illustrates an anemometer 10, in particular the base 12, as being placed over a surface of interest 38 and as having the capabilities of being attached thereto by the insertion of bolts (not shown) into the openings 14 which, in turn, are preferably placed over complementary threaded openings (not shown) so that the base 12 may be rigidly affixed to the surface of interest 38. The base 12 is preferably of a disk-like shape and includes the central opening 40 that may be threaded so as to threadedly engage one end of a complementary threaded lower end of the first portion 18 of the elongated member 16 so that the base 12 and the elongated member 16 may be rigidly connected. For an alternative arrangement, the base 12 and the elongated member 16 may be welded to each other. Welding is preferred since any play in the threads between the base 12 and elongated member 16 may affect the output of the anemometer 10 and possibly any attempt to overcome the play therebetween, by tightening the threaded connection, may result in the deformation of the elements 12 or 16, or even the sensing head 18. The elongated member 16 is inserted into a recess 42 of the sensing head 18 and has a transverse extending hole 44 which is used to connect the elongated member 16 to the sensing head 18, and which may be further described with reference to FIG. 4, which is a view taken along line 4–4 of FIG. 3.

Figure 4:
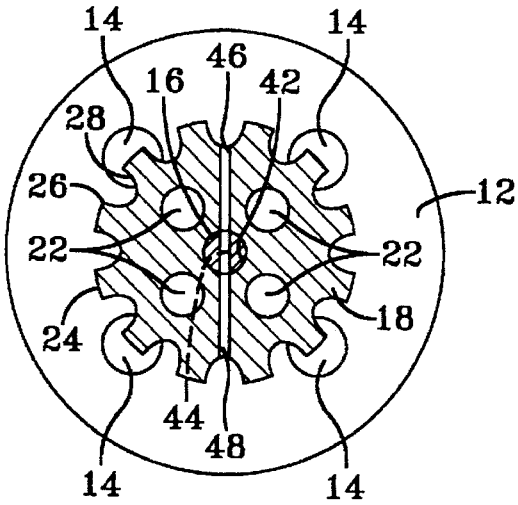
FIG. 4 is a view, taken along line 4—4 of FIG. 3, illustrating further details of the sensing head of the anemometer of FIG. 1.

FIG. 4 illustrates a transverse opening 46 in the sensing head 18 which is in alignment with the transverse extending hole 44 (not shown) of the elongated member 16 and into which is inserted a suitable locking pin 48. FIG. 4 further illustrates the outer surface 24, the flutes 26, and the edges 28 all of the sensing head which as more fully described in U.S. patent application Ser. No. 08/231,097, induces a turbulent boundary layer in the fluid flowing over the first portion 18 that controls the linearity of the aerodynamic drag force with respect to velocity squared. The aerodynamic drag force, in turn, causes the second portion 20 of the elongated member 16 to be subjected to strain and correspondingly deflect. An alternative sensing head 50 having many of the features of the sensing head 18, but providing accuracy improvements thereover, to be more fully described with reference to FIGS. 9–15, is shown in FIG. 5.

Figure 5B:
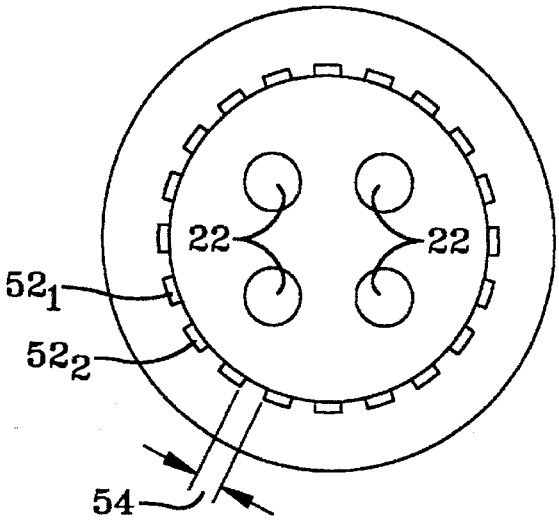
FIG. 5 is composed of FIGS. 5A and 5B respectively illustrating a side view and a top view of one embodiment of a sensing head particularly suited for the anemometer of the present invention.
Figure 5A:
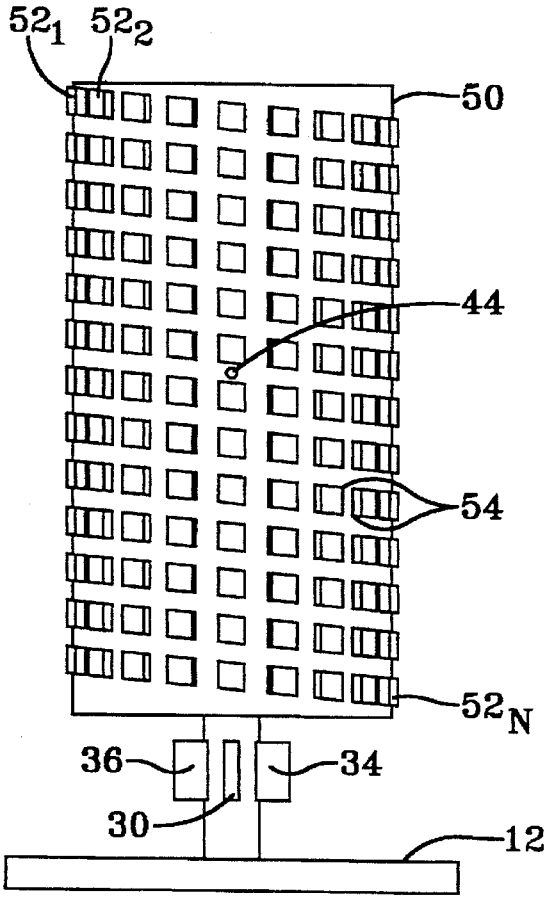

FIG. 5 is composed of FIGS. 5A and 5B that respectively illustrate a side view and a top view of the sensing head 50. FIG. 5 illustrates the sensing head 50 as having a plurality of surface irregularities $52_1$, $52_2$, . . . $52_N$ in the form of protrusions extending from the outer surface of the sensing head 50 and arranged in a helical pattern. The helical pattern repeats itself about every 360° and the protrusions $52_1$, $52_2$, . . . $52_N$, are spaced apart from each other at various degrees e.g., approximately every 22.5° to 45° and preferably about every 30° within this 360° cycle. For example, there may be from 8 to 12 protrusion in each of the 360° cycles and anywhere from about 8 to 20 cycles of 360° in a helical pattern. The protrusions $52_1$, $52_2$, . . . $52_N$ serve as the means for inducing a turbulent boundary layer in the fluid flowing over the sensing head 50 which, in turn, creates the aerodynamic drag force that causes the deflection of the second portion 20 having the sensors 30, 32, 34 and 36 mounted thereon. Another sensing head 56 incorporating the principles of the present invention may be further described with reference to FIG. 6.

Figure 6B:
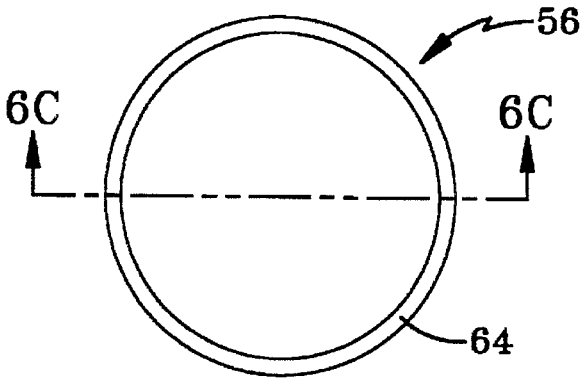
FIG. 6 is composed of FIGS. 6A, 6B, and 6C illustrating a further embodiment of a sensing head particularly suited for the anemometer of the present invention.
Figure 6A:
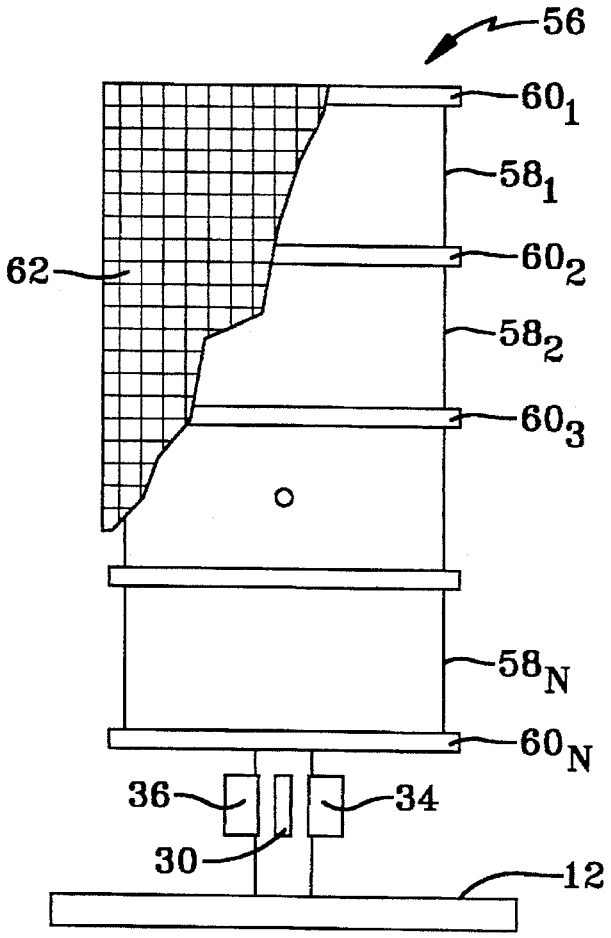
Figure 6C:
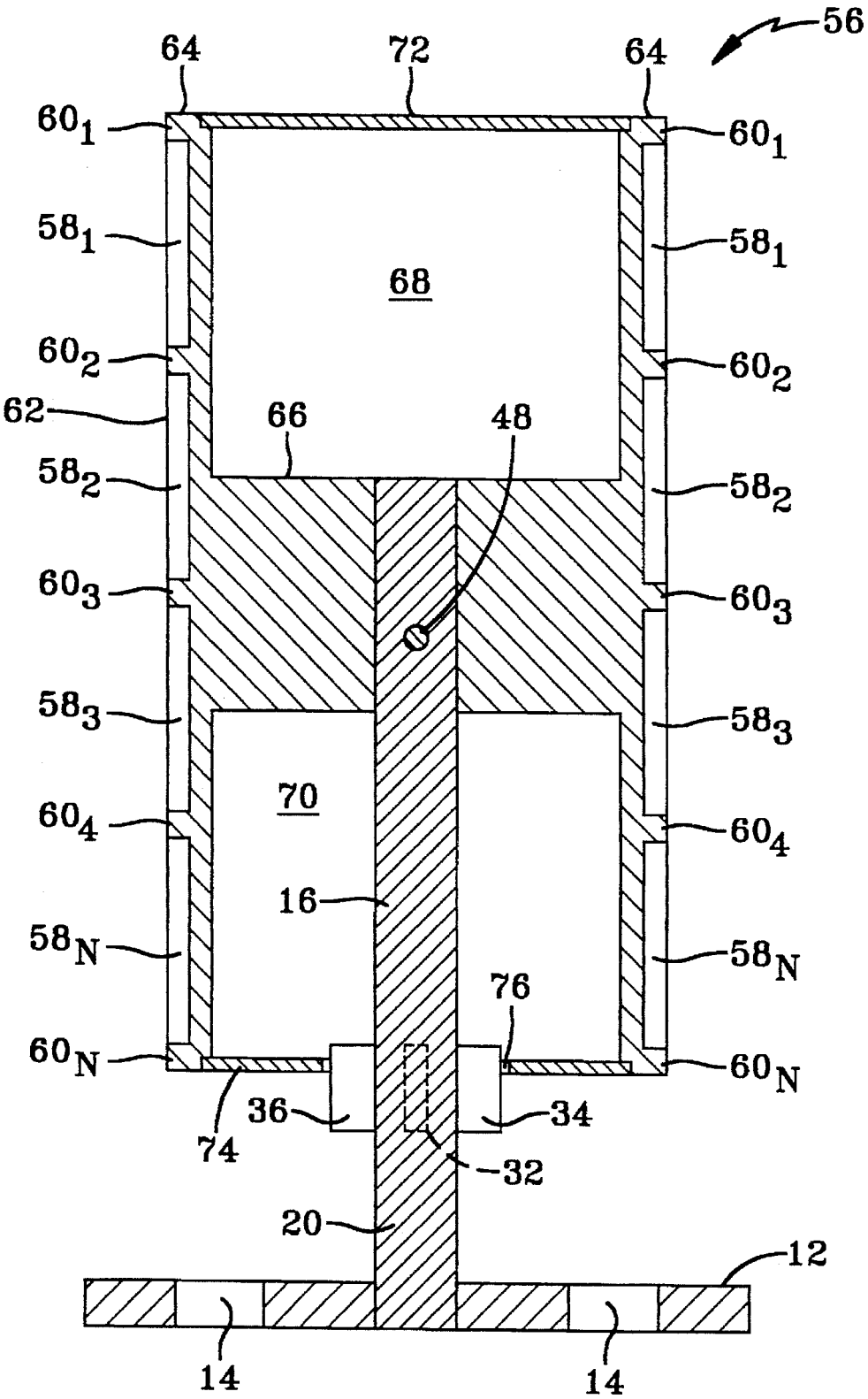

FIG. 6 is composed of FIGS. 6A, 6B, and 6C which respectively illustrate a side view, a top view, and a view taken along line 6C—6C of FIG. 6B, all showing particular details of the sensing head 56. FIG. 6A illustrates a plurality of cavities $58_1$, $58_2$, . . . $58_N$, that are formed between shelves $60_1$, $60_2$, $60_3$, . . . $60_N$ that laterally extend outward past the cavities $58_1$, $58_2$, . . . $58_N$. FIG. 6A further partially illustrates a wire mesh serving as a screen or shroud 62 longitudinally placed over the shelves $60_1$, $60_2$, . . . $60_N$ and correspondingly covering the cavities $58_1$, $58_2$, . . . $58_N$. FIG. 6B illustrates a rim portion 64 related to the upper shelf $60_1$. Further details of the cavities $58_1$, $58_2$, . . . $58_N$ and other features of the structure of the sensing head 56 may be further described with reference to FIG. 6C.

FIG. 6C illustrates the sensing head 56 as having at least one cavity but preferably a plurality of cavities $58_1$, $58_2$, . . . $58_N$, longitudinally located along the sensing head 56 and having a wire mesh 62 mounted thereon. The wire mesh 62 is preferably of the stainless steel type and is selected from at least one of about one-quarter (¼) inch square grid and one of about one-eighth (⅛) inch square grid. The wire mesh 62, in cooperation with the cavities $58_1$, $58_2$, . . . $58_N$, serves as the means for creating the turbulent boundary layer in the fluid flowing over the sensing head 56. The wire mesh 62 of sensing head 56 may have grids other than the aforementioned one-quarter and one-eighth types so long as the desired turbulent boundary layer is created by the selected wire mesh. The sensing head 56 that has the one-quarter inch square grid is herein termed "the large mesh sensing head 56," whereas the sensing head 56 having the one-eighth inch square grid is herein termed "the small mesh sensing head."

The sensing head 56 comprises a skeleton structure 66 having a shoulder and arms that form the extension $60_1$ . . . $60_N$, as well as cavities 68 and 70. As best seen in FIG. 6C, the extensions $60_1$, $60_2$, $60_3$, $60_4$, and $60_N$ form the cavities $58_1$, $58_2$, $58_3$ and $58_4$. The cavity 68 is closed off by a cap 72 and, similarly, the cavity 70 is closed off by a cap 74 but allows for an opening 76 that accommodates the insertion of the elongated member 16 carrying the sensor 30, 32 (not shown), 34 and 36. The cavities 68 and 70 are capped off to prevent unwanted pressure fluctuations that might otherwise be caused by open holes in the sensing head 56. The holes 22 of FIGS. 1, 4 and 5B also preferably have caps (not shown) that prevent unwanted pressure fluctuations. The cavities 68 and 70 of FIG. 6C, as well as the holes 22 of FIGS. 1, 3, 4 and 5 reduce the mass of the anemometer 10 without changing the profile that it presents to the fluid flow. The reduction in mass of the anemometer 10 controls the operational natural frequency, to be further described, of the anemometer 10. The operation of the anemometer 10 may be first described with reference to FIG. 7.

Figure 7:
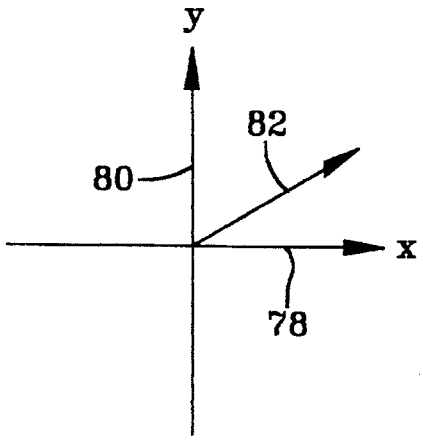
FIG. 7 is a diagrammatic illustration of the operation of the sensors of the present invention for detecting the velocity and direction of a fluid flowing in the X-Y plane.

FIG. 7 diagrammatically illustrates the operation of the anemometer 10 in a single plane defined by the X and Y axes. More particularly, FIG. 7 illustrates the operation of a single anemometer 10 having its sensors arranged as shown in FIG. 2. The anemometer 10 produces electrical signals generated by the sensors 30, 32, 34 and 36 which are preferably strain detecting sensors that are bonded, by a suitable adhesive, to the outer surface of the second portion 20 of the selected sensing head 18, 50, or 56 of the anemometer 10. The sensors 30, 32, 34 and 36 operate to detect the deflection induced strain of the elongated member 16 under various wind loads. As previously discussed, the anemometer 10 has no moving part and is particularly advantageous in measuring wind speeds in excess of 100 knots and also those winds that may manifest pulsating conditions. Also, as previously discussed, the edges 26 of sensing head 18, the protrusions $52_1$ . . . $52_N$ of sensing head 50, or the wire mesh 62 of the sensing head 56 induces a turbulent boundary layer in the fluid flowing over the first portion 18 which, in turn, controls the linearity of the aerodynamic drag force with respect to velocity squared. The aerodynamic drag force, in turn, causes the second portion 20 of the elongated member 16 to be subjected to strain and correspondingly deflect. The strain sensors 30, 32, 34 and 36 mounted on the second portion 20 measure the amount of deflection induced strain and the direction of the deflection induced strain when the first portion 18 is arranged so as to intercept the flowing fluid, such as wind.

As a result of the fluid flow, the elongated member 16 is deflected from its normal upright position and the deflection is detected by the strain sensors 30, 32, 34, and 36. In a well-known manner, each of the strain sensors 30, 32, 34 and 36 generates its own signal which is proportional to the amount of the deflection induced strain that it detects. As further known, the signals generated by the strain sensors 30, 32, 34 and 36 may be vectorially added so as to generate a resultant third signal that is proportional to the velocity and to the direction of the fluid flow and may be further described with reference back to FIG. 2.

As seen in FIG. 2, the sensors 30, 32, 34 and 36 are arranged so that one sensor is located in each quadrant and so that one pair, such as 30 and 32, senses the deflection of the elongated member 16 in the X direction, and the other pair, such as 34 and 36, senses the deflection of the elongated member 16 in the Y direction. For such an arrangement, and with reference back to FIG. 7, the sensors 30 and 32 supply a vector signal 78, whereas the sensors 34 and 36 supply a vector signal 80. The vector signals 78 and 80 are vectorially added to each other so as to provide a resultant signal, indicated by vector 82, which is proportional to the velocity and to the direction of the flowing fluid intercepted by anemometer 10, in particular, intercepted by the sensing head 18, 50 or 56. As seen in FIG. 7, the resultant signal 82 is indicative of the fluid flowing in the X-Y plane. A pair of anemometers 10 may be arranged so as to provide for the detection of the velocity and the direction of fluid flowing in three dimensions and which may be further described with reference to FIG. 8.

Figure 8A:
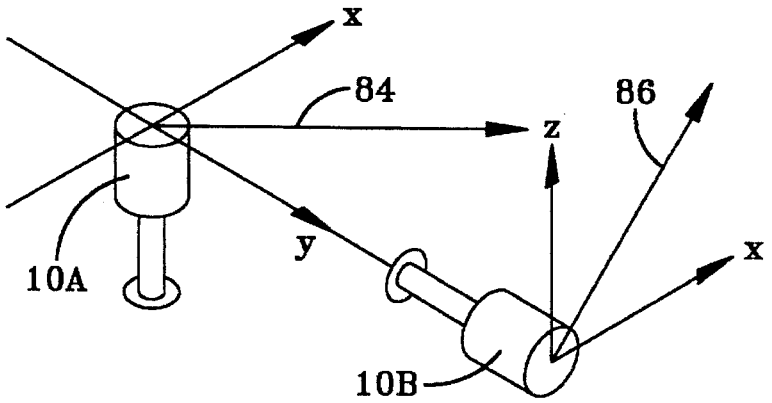
FIG. 8 is composed of FIGS. 8A and 8B diagrammatically illustrating the cooperative action of the sensors of two anemometers of the present invention involved in detecting the velocity and direction of a fluid flowing in the X-Y-Z planes.
Figure 8B:
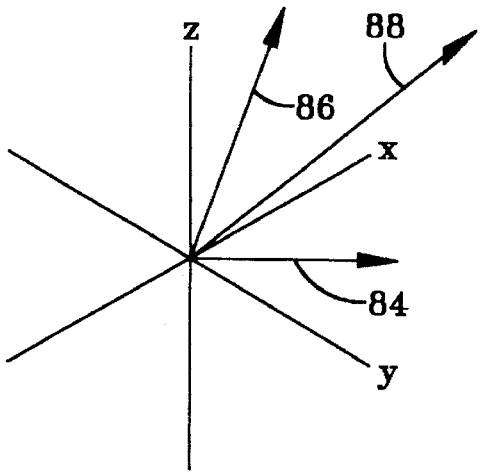

FIG. 8 is composed of FIGS. 8A and 8B, in which FIG. 8A illustrates the individual anemometers 10, shown as 10A and 10B, and the resulting vector signals 84 and 86, respectively, and, wherein FIG. 8B indicates the resulting vector signal 88 derived from vector signals 84 and 86. More particularly, FIG. 8A illustrates that the two anemometers 10A and 10B may be mounted at right angles, with respect to each other, to measure wind velocity and the direction of the wind. The anemometers 10A and 10B respectively produce the vector signal 84 associated with the X-Y plane and the vector signal 86 associated with the X-Z plane. FIG. 8B illustrates that the signals corresponding to the resulting vectors 84 and 86 of FIG. 8A can be vectorially added, in a manner well-known, to produce the resultant vector signal 88 which indicates the velocity and direction of the wind flowing in the three dimensional axes X, Y, and Z.

It should now be appreciated that the practice of the present invention provides for sensing heads 18, 50 or 56 associated with the anemometer 10 that create a turbulent boundary layer which produces an aerodynamic drag force which, in turn, causes the sensing head 18, 50 or 56 of the elongated member 16 of the anemometer 10 to be subjected to strain and correspondingly deflect, thereby, allowing for the strain sensors 30, 32, 34 and 36 to measure the amount of deflection induced strain and the direction of the deflection induced strain.

The anemometer 10, including any of the sensing heads 18, 50 and 56, has a disadvantage in that it has a tendency to vibrate in the fluid flow. Some of this vibration is induced as a result in variations in wind speed and variations in the direction of fluid flow with both variations occurring for short, rapid intervals. Another contributor to this vibration is the natural frequency at which the body or mass of anemometer 10 vibrates. All of the vibrations so created are manifested by a signal that is generated by each of the strain sensors 30, 32, 34 and 36. The induced vibration, exclusive of the natural frequency vibration of the anemometer itself, is a desired measurement and varies over a range that is determined by varying the load, that is, the flowing fluid to which the anemometer 10 is subjected. The natural frequency created by the anemometer itself is an unwanted signal that is constant in frequency and is determined by the physical characteristics of the anemometer 10, including its mass.

If the desired induced vibrations being measured are close to the natural frequency of the anemometer 10, the signal generated by each of the strain sensors includes unwanted natural frequency components which makes it difficult, if not impossible, to distinguish the desired signal created by the fluid flow from the unwanted contributions thereof generated by the anemometer 10 itself and occurring at its natural frequency. Therefore, it is desired to have a substantial separation between the anticipated range of the induced vibrations desired to be measured and the natural frequency of the anemometer 10 so that well-known filtering techniques can be used to remove the unwanted natural frequency contributions without unnecessarily attenuating the desired induced vibration signals generated by the flowing fluid. The present invention provides for the separation by allowing for the reduction/control of the mass of the sensor head, in particular, the sensor head 18, 50, 56 of the anemometer 10. In a preferred form of the invention, this control may be accomplished by providing the holes 22 of the sensing heads 18 and 50 or the cavities 68 and 70 of the sensing head 56. The size of the holes, or the size of the cavities, may be used as a means to determine the desired natural frequency of the anemometer so as to provide a separation between the natural frequency of the anemometer 10 and the induced vibrations being measured by the anemometer 10.

It should now be appreciated that the practice of the present invention provides means for controlling the natural frequency of the anemometer so that the undesired vibrations associated therewith may be separated from the range of frequencies encompassing the desired vibrations to be measured.

The anemometer 10 having the sensing head 18 serves well its intended purpose. The anemometer 10 having sensing head 50 or 56 provides for improved accuracy, relative to an anemometer having a sensing head 18, as well as improvement in the anemometer's 10 ability to be easily and accurately inserted into a flowing fluid so as to measure the velocity and direction thereof. The benefits of the anemometer 10 having the sensing head 50 or 56 may be further described with reference to FIGS. 9–15.

Figure 9:
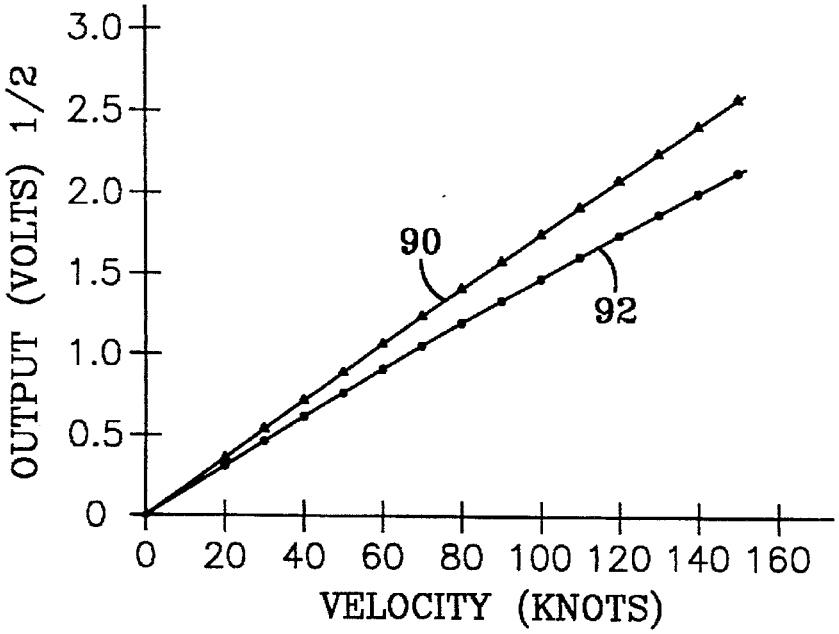
FIG. 9 is a calibration curve associated with the sensing heads of the anemometer of the present invention.

FIG. 9 is a calibration curve having an X axis indicated in velocity (in knots) and a Y axis indicated by the typical output (in square root of volts) of the sensors 30, 32, 34 and 36 (see FIG. 2) associated with the anemometer 10. FIG. 9 has two plots 90 and 92 which respectively indicate a calibration curve related to an anemometer 10 having a sensing head 18 and an anemometer 10 having a sensing head 56 carrying the large size wire mesh and previously termed "the large mesh sensing head." The small wire mesh sensing head 56 and the sensing head 50 of FIG. 5 have calibration curves similar to plot 92. Two classifications that specify the data point deviation from the calibration curve of FIG. 9, are the calibration errors shown in FIG. 10 and the independent non-linearity errors shown in FIG. 11.

Figure 10:
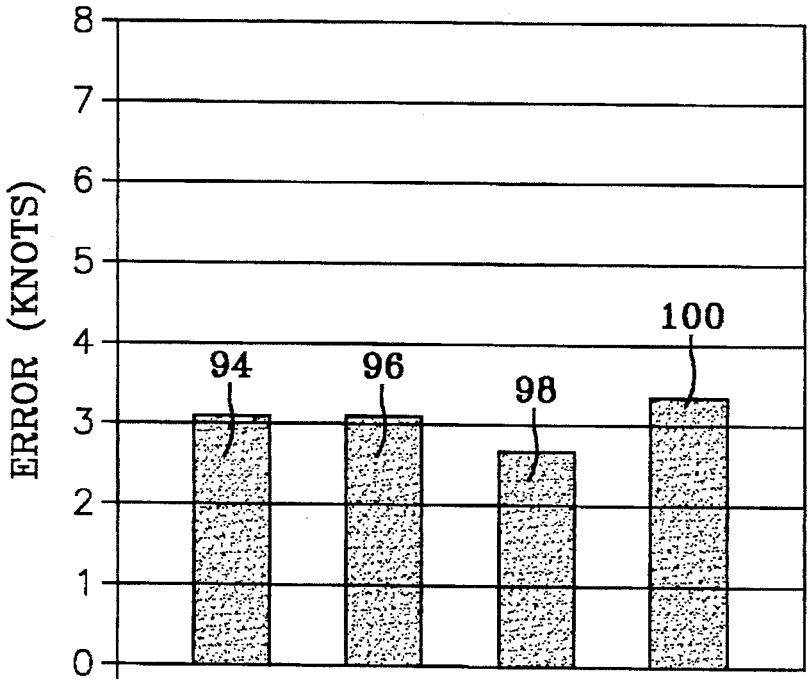
FIG. 10 is a calibration error curve associated with the sensing heads of the present invention.

FIG. 10 has a Y axis indicating the calibration errors in knots. FIG. 10 further has bar charts 94, 96, 98, 100 that respectively illustrate the calibration error for the sensing head 18, the small mesh sensing head 56, the large mesh sensing head 56, and the sensing head 50. From FIG. 10 it is seen that the large mesh sensing head 56 (bar chart 98), manifests the smallest calibration error.

Figure 11:
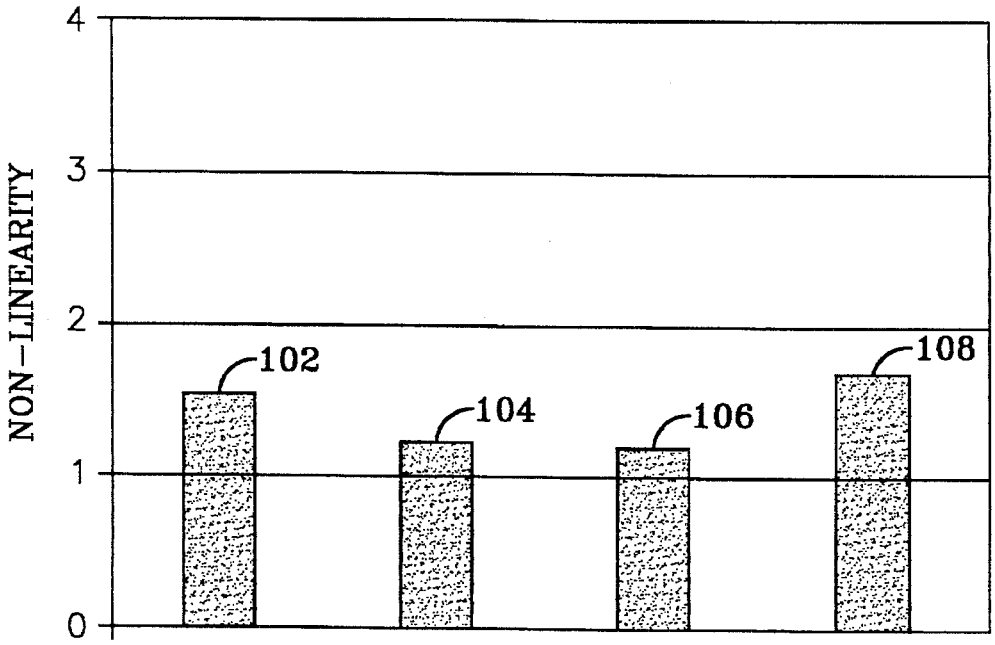
FIG. 11 illustrates the non-linearity deviations from the calibration curve of FIG. 9 for the sensing heads of the present invention.

FIG. 11 has a Y axis illustrating the independent, non-linearity of the deviations from the desired straight line calibration curves of FIG. 9. FIG. 11 further has four bar charts 102, 104, 106 and 108 that respectively illustrate the non-linearity of the anemometer 10 incorporating the sensing head 18, the small mesh sensing head 56, the large mesh sensing head 56, and the sensing head 50. From FIG. 11 it is seen that the sensing head 56 carrying either the small (plot 104) or large (plot 106) wire mesh has less non-linearity than the sensing head 18.

FIG. 12 is composed of FIGS. 12A, 12B, 12C and 12D which respectively illustrate the angular resolution related to an anemometer 10 having a sensing head 18 (plot 110), a small mesh sensing head 56 (plot 112), a large mesh sensing head 56 (plot 114), and a sensing head 50 (plot 116). Each of the FIGS. 12A, 12B, 12C and 12D has an X axis indicating the angle of flow incidence (given in degrees) related to the interception of anemometer 10 of the flowing fluid being measured and a Y axis indicating the angular resolution error (given in +/–degrees).

FIG. 12 shows data collected for measuring wind moving at 100 knots. A comparison between plots 110 and 114 reveals that plot 114 is relatively more constant and, accordingly, an anemometer 10 having the large mesh sensing head 56 provides for measurements of wind speed having a lower angular resolution error as compared to a similar measurement provided by the anemometer 10 having a sensing head 18. The angular resolution errors of FIG. 12 consist of both angular and velocity error components that are respectively illustrated in FIGS. 13 and 14.

Figure 13:
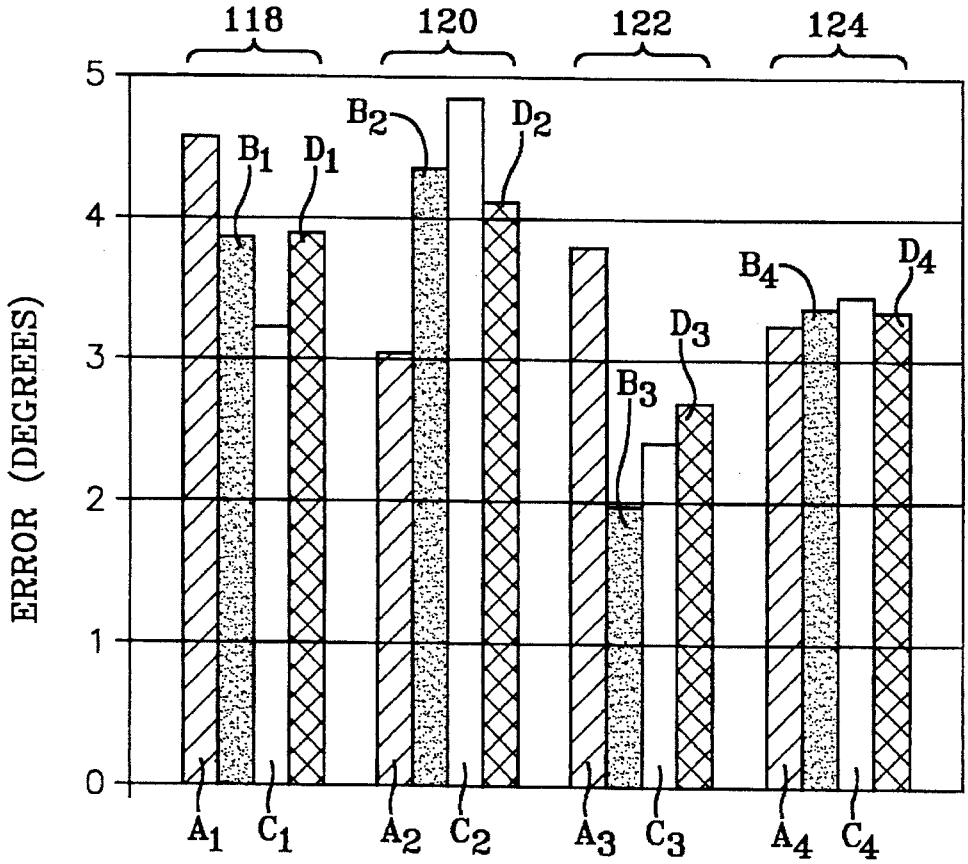
FIG. 13 illustrates the angular measuring error contributions to the curves of FIG. 12.
Figure 14:
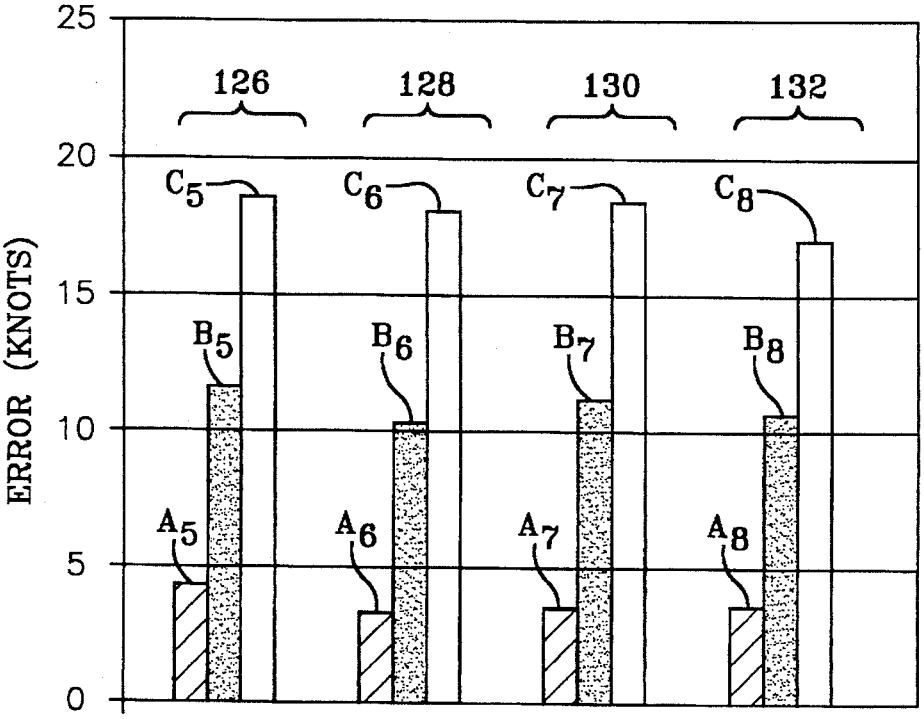
FIG. 14 illustrates the velocity measuring error contributions to the curves of FIG. 12.
Figure 15:
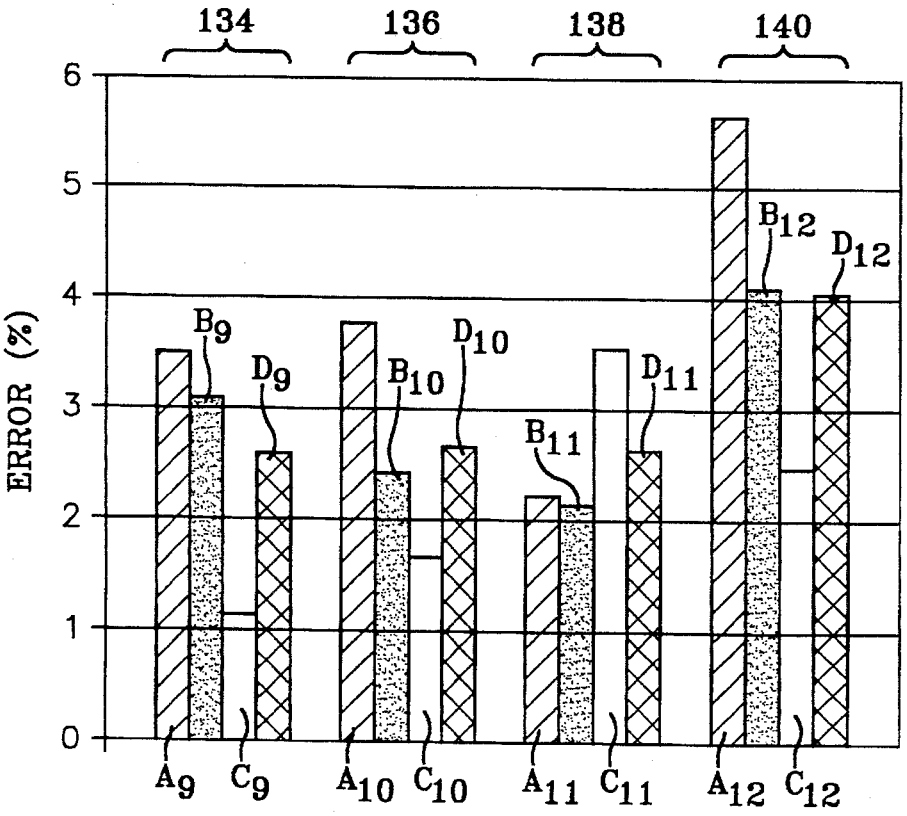
FIG. 15 illustrates the angle of attack error associated with the sensing heads of the present invention.

FIGS. 13 and 14, as well as FIG. 15, illustrate a plurality of bar charts indicated by either reference letter A, B, C or D associated with the measurements of wind speed at 20 knots, 60 knots, 100 knots, and the mean error of the related sensing head being used for the anemometer 10. The letters A, B, C and D are respectively associated with the bar chart indicated by a single cross-hatch representation, a solid representation, a clear representation, and a double cross-hatch representation. Further, the subscripts 1, 2, 3, 4, 5, 6, 7, 8, 9, 10, 11 and 12 are used in association with the reference letters A, B, C and D and are respectively associated with the error distribution bar charts 118, 120, 122 and 124 (see FIG. 13), 126, 128, 130 and 132 (see FIG. 14), and 134, 136, 138 and 140 (see FIG. 15).

As seen in FIG. 13, the large mesh sensing head 56 (error distribution 122) manifests a lower angular error than the angular error yielded by the sensing head 18 (error distribution 118).

As seen in FIG. 14, the sensing head 50 (error distribution 132) manifests a lower velocity error than the velocity error of the sensing head 18 (error distribution 126).

FIG. 15 illustrates the angle of attack error associated with the sensing head 18, 50, and 56. As is known, the angle of attack is the acute angle between the direction of the wind being measured and the chord of the device, such as sensing head 18, 50 or 56, being inserted into the flowing fluid being measured. From FIG. 15 it is seen that the large mesh sensing head 56 has a lower mean error ($D_{11}$) than that ($D_9$) of the sensing head 18. Further, it is seen that angle of attack errors related to measuring wind velocities of 20 and 60 knots are lower for the large mesh sensing head 56 than those related to the sensing head 18.

It should now be appreciated that the practice of the present invention provides for sensing heads 50 and 56 having an overall improvement in the accuracy of measuring the velocity and direction of the flowing fluid, relative to the measurement yielded by an anemometer 10 having a sensing head 18.

Many modifications or variations of the present invention are possible in view of the above disclosure. It is, therefore, to be understood, that within the scope of the appended claims, the invention may be practiced otherwise than as specifically described.

What we claim is:

1. An anemometer for measuring the speed and direction of a fluid flowing over a surface of interest, said anemometer comprising:

(a) a base having means for connecting to said surface of interest;

(b) an elongated member having a resiliency characteristic and connected to and extending from said base, said elongated member having first and second portions at opposite ends thereof with the first portion being cylindrical and having means for controlling an aerodynamic drag force when placed in flowing fluid which, in turn, causes said second portion of said elongated member to be subjected to strain and thereby deflect; and (c) a plurality of strain sensors mounted on said second portion in a predetermined manner to measure the amount of deflection induced strain and the direction of said deflection induced strain when said first portion is placed in said flowing fluid;

wherein said means for controlling an aerodynamic drag force comprises surface irregularities arranged in a predetermined pattern for inducing a turbulent boundary layer in the fluid flowing over said first portion.

2. The anemometer according to claim 1, wherein said surface irregularities comprise protrusions extending from said first portion and arranged in a helical pattern.

3. The anemometer according to claim 2, wherein said helical pattern repeats itself in a cycle about every 360 degrees and said protrusions are spaced apart from each other from about 22.5 degrees to about 45 degrees within said 360 degree cycle.

4. The anemometer according to claim 1, wherein said surface irregularities comprise an arrangement formed by at least one cavity longitudinally located along said first portion and having a wire mesh mounted thereon.

5. The anemometer according to claim 4, wherein said wire mesh is selected from one-quarter (¼) inch square grid and about one-eight (⅛) inch square grid.

6. The anemometer according to claim 1, wherein said second portion is cylindrical and said plurality of sensors comprises four sensors spaced apart from each other by about 90 degrees around said portion and arranged into two pairs with each pair comprising two sensors arranged diametrically opposite to each other.

* * * * *